United States Patent [19]

Sciaky et al.

[11] Patent Number: 4,626,653
[45] Date of Patent: Dec. 2, 1986

[54] METHOD OF AND INSTALLATION FOR SPOT-WELDING BY LASER BEAM

[75] Inventors: Mario Sciaky, Paris; Roland Cazes, St Maur; Georges Sayegy, Paris, all of France

[73] Assignees: Sciaky, S.A., Vitry sur Seine, France; Mario Sciaky, Paris

[21] Appl. No.: 621,354

[22] Filed: Jun. 18, 1984

[30] Foreign Application Priority Data

Jun. 24, 1983 [FR] France ................................ 83 10531

[51] Int. Cl.⁴ ............................................. B23K 26/00
[52] U.S. Cl. ........................ 219/121 LC; 219/121 LD; 219/121 LM; 219/121 LV
[58] Field of Search ................. 219/121 LC, 121 LD, 219/121 LA, 121 LB, 121 LG, 121 LH, 121 LJ, 121 LU, 121 LQ, 121 LR

[56] References Cited

U.S. PATENT DOCUMENTS 3,619,550 11/1971 Matthews ................ 219/121 LU X
4,461,947 7/1984 Ward ....................... 219/121 LG X

FOREIGN PATENT DOCUMENTS 0101596 8/1979 Japan ............................ 219/121 LA Primary Examiner—M. H. Paschall
Attorney, Agent, or Firm—Seidel, Gonda, Goldhammer & Abbott

[57] ABSTRACT

Method of and installation for spot-welding by laser beam, the method characterized in that the focusing means (3) undergoes displacement so that the point of focus (4) of the beam on the workpieces (4, 5) describes at least a path which is closed upon itself and of which the surface area of fusion obtained corresponds to the desired spot weld.

The invention is applied to the welding of superposed workpieces.

2 Claims, 4 Drawing Figures

METHOD OF AND INSTALLATION FOR SPOT-WELDING BY LASER BEAM

The invention relates to a method of and an installation for spot-welding by laser beam.

The construction of products manufactured from thin metal plates often comprises lap-welding and jointing processes which give rise to simple methods of manufacture. This is the case with motor vehicle bodies, domestic electrical appliances, metal furniture etc.

In relation to butt-welding, lap-welding has considerable advantages, particularly by reason of the fact that the precision with which the edges to be welded have to be positioned in relation to each other and the precision of positioning of the welding tool in relation to the joint are no longer so vital. Moreover, intermittent spot-welding is sufficient to obtain a satisfactory joint when the appliance produced is not a container as is often the case.

In order to make such joints, the process mainly used is that of resistance welding which makes it possible to obtain circular welds, the diameter of which is equal to $5\sqrt{e}$, in which e is the thickness of the thinnest plate. Gas-welding has also been used, employing a tungsten electrode which in relation to resistance welding offers the advantage of needing very low current strengths and hence far less bulky electric wires to supply the welding tool. But this method has no penetration effect and is confined to plates 0.5 to 0.8 mm thick at most.

The use of a laser beam makes it possible to obtain a punctiform fusion with no restriction on thickness and over a very wide range of so-called thin plates which are encountered in the types of manufacture mentioned earlier, thanks to its penetration effect which ensures its high density of power at the point of focus.

It is known that such a weld is very narrow, which is of interest in numerous applications but which is a drawback in the case of a superposed assembly.

For example, if it is desired to make a weld line between two pieces which are placed edge to edge, using a laser beam, it is known for the means of focusing the beam to be caused to vibrate so that its point of focus on the workpieces moves at a high speed transversely of the weld line simultaneously with relative displacement of the workpieces and of the head along the weld line to be made. In this case, high frequency transverse sweeping of the beam on either side of the weld line has the effect of simultaneously producing fusion of the metal of the two pieces to be assembled over the entire width which is swept, which is considered in this case as technically acceptable.

If it is desired to make a joint between two superposed pieces by spot-welding, it is obviously possible to remedy the small surface area of each weld made by focused laser beam by multiplying the number of such welds but in many cases this is neither technically nor economically viable.

It is a particular object of the present invention to remedy these drawbacks and to this end it relates to a method of spot-welding by laser beam which resides in focusing on the superposed workpieces which are to be spot-welded and by using a focusing means, a laser beam produced by a laser beam generator, the said method being characterised in that the focusing means is displaced in such a way that the point of focus of the beam on the pieces describes at least a trajectory which is enclosed on itself and the resultant fusion area of which corresponds to the desired welding point.

According to a further characteristic feature of the invention, the rate of the movement of the focusing means and hence of the point of focus is determined in such a way that having regard to the power of the focused beam the superposed workpieces are fused progressively along the trajectory described by the point of focus in such a way as to obtain a spot-weld during the course of a single revolution of the focusing means.

According to another characteristic feature of the invention, during the course of movement of the focusing means, the power of the laser beam is modulated.

By way of non-limitative example, the invention is illustrated in the accompanying drawings, in which.

The object of the present invention is to procure a means for using a focused laser beam in order rapidly to obtain a traversing weld of a surface area greater than that normally obtained with a focused beam which is maintained fixed and which satisfies the technical conditions of the envisaged construction, particularly with regard to solidity of the joint and the outward aspect of the assembled zone, without this weld made between the two superposed pieces being likely to pierce the pieces.

Figure 1:
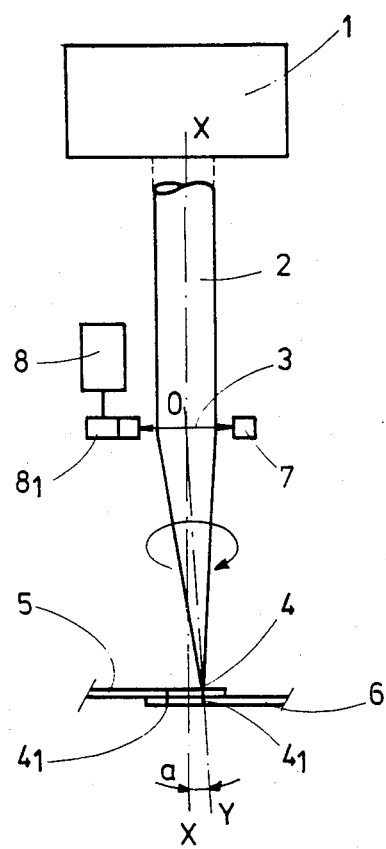
FIG. 1 is a diagrammatic side view of a first embodiment of the invention.

In the embodiment shown in FIG. 1, the installation is composed of a laser beam generator 1 which produces a laser beam 2 which is carried to a focusing means 3 consisting for example of a lens, for focusing this beam 2 on a point 4 situated on the pieces 5 and 6 which are superposed and which it is desired to join by spot-welding.

In accordance with the invention, the focusing means 3 is placed on a support 7 which is capable of being rotated by an electric motor 8 through a pinion $8_1$ mounted on the output shaft of this motor and meshing with an externally toothed ring provided on the support 7.

The focusing lens 3 is fixed on the support 7 in such a way that its optical axis O–Y subtends an angle a with the axis of rotation X—X of the support 7 which is coincident with the axis of the laser beam 2.

Thus, upon rotation of the support 7, the point of focus 4 of the beam on the superposed workpieces 5, 6 describes a closed circular line of axis X—X and in such a way that having regard to the power of the focused beam employed, and of its speed of displacement, it is possible successively to obtain fusion of the metal of the two workpieces and to weld them along this circular line $4_1$, the cumulative thermal effect of this operation ensuring propagation of such fusion and of this weld over all or part of the zone inside this circular line which is not struck by the focused laser beam and which therefore makes it possible to avoid the superposed workpieces.

A spot-weld of sufficient surface area can thus be obtained by means of a single rotation of the focusing means 3, of course adapting the speed of rotation to the power of the focused laser beam and to the thickness of the superposed pieces which are to be welded.

In practice, however, it will be preferable to pursue rotation of the focused laser beam beyond this single rotation, over a fraction of a turn, in order to ensure an overlap of the welded ends of the circular line.

Figure 2:
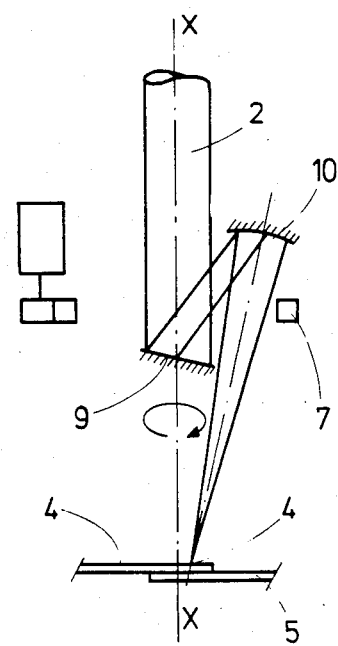
FIG. 2 is a side view of another embodiment of the invention.

In the embodiment shown in FIG. 2, the laser beam 2 is carried to a focusing means composed of a flat mirror 9 and a concave mirror 10 positioned on the support means 7.

In this case, the laser beam 2 reflected by the flat mirror 9 is directed at the concave mirror 10 which focuses the beam on the point 4 situated on the superposed workpieces 5, 6.

In this case also, the offset on the pieces 4 and 5 of the axis X—X and of the point of focus 4 approximately determines the radius of the surface area of the welding point made, rotation of the assembly 7, 9, 10 causing the point of focus 4 to describe a circle on the welded pieces.

In accordance with the invention, it is possible to obtain a greater regularity of fusion and therefore a better quality of weld by modulating the power of the laser beam during the course of rotation of the focusing device.

Figure 3:
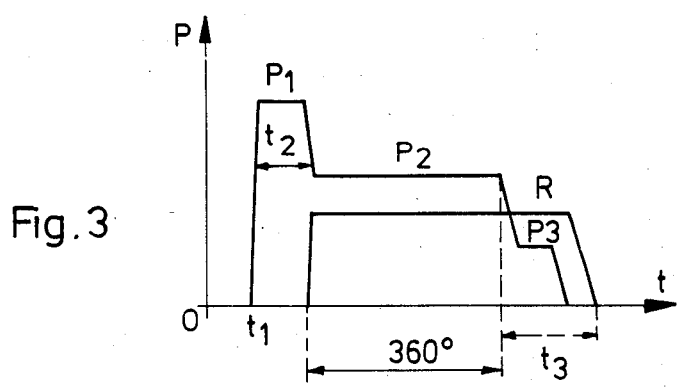
FIGS. 3 and 4 are two graphs which illustrate evolution of the power of the focused laser beam during the course of one welding cycle.

Thus, according to the example shown in the graph in FIG. 3 which represents the evolution of the power P of the focused laser beam as a function of time and in relation to the rotation R of the focusing means, it will be noted that when the focusing device is placed in position in relation to the plates (moment in time $t_1$), the laser beam is sent out at a power $P_1$ which depends essentially on the thickness of the workpieces to be welded and this for a period of time $t_2$ during the course of which the rotating device is not operated.

Then, the rotating device is set in operation at a constant speed, while the power of the laser beam is set at a level $P_2$ which is lower than $P_1$.

Once a complete rotation of the laser beam has been obtained, rotation is maintained for a fraction of a turn (point in time $t_3$) during which the power of the beam is regulated to a third level $P_3$ which is less than $P_2$.

By implementing the invention, therefore, it is possible to obtain fusion over a point of 5 mm diameter between two superposed plates 1 mm thick with powers of the order of 2 kW for $P_1$ and a working time of not more than 1 second, the diameter of rotation of the focusing point being of the order of 2-3 mm.

According to the invention, it is likewise possible to obtain a spot-weld by the juxtaposition of successive points of fusion formed along the circular line of displacement of the point of focus.

Figure 4:
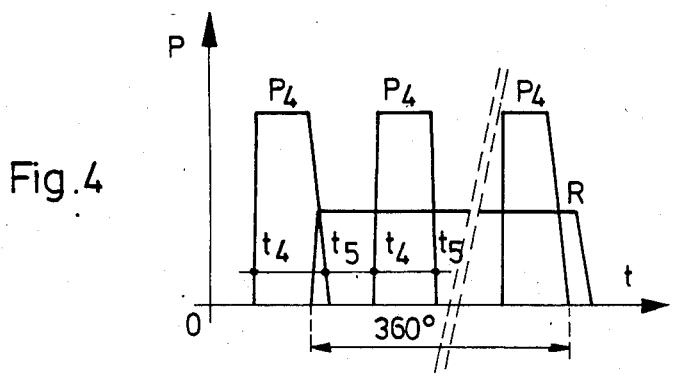

In this case, the preferred cycle is as follows (see FIG. 4): the power of the laser beam is regulated to a constant power $P_4$ and the focused laser beam is directed at the workpieces for a time $t_4$ sufficient to produce fusion of the two superposed pieces at the level of the point of impact of the focused laser beam. Then, rotation R of the focusing means is controlled while the beam is interrupted at regular intervals for periods $t_5$, for example equivalent to $t_4$ until such time as the focused beam describes a complete circle.

We claim:

1. A method of spot welding by laser beam comprising: emanating a laser beam from a generator; focusing the laser beam on a work piece; displacing the focused beam in a desired path on the work piece; modulating the power of the emanating laser beam at a first power level prior to displacement, at a second power level less than the first power level during a first portion of the displacement and at a third power level less than the second power level during a second portion of the displacement.

2. A method as claimed in claim 1 wherein the focused beam is displaced in a circular pattern and wherein the second power level of the modulation is commenced for substantially 360° of the circular pattern displacement.

* * * * *